US008427016B2

(12) United States Patent
So (10) Patent No.: US 8,427,016 B2
(45) Date of Patent: Apr. 23, 2013

(54) LINEAR VIBRATOR

(75) Inventor: Min Young So, Gyunggi-do (KR)

(73) Assignee: Samsung Electro-Mechanics Co., Ltd., Suwon-Gyunggi-do (KR)

( * ) Notice: Subject to any disclaimer, the term of this patent is extended or adjusted under 35 U.S.C. 154(b) by 251 days.

(21) Appl. No.: 12/618,725

(22) Filed: Nov. 14, 2009

(65) Prior Publication Data

US 2011/0018369 A1    Jan. 27, 2011

(30) Foreign Application Priority Data

Jul. 24, 2009   (KR) ................. 10-2009-0067964

(51) Int. Cl.
*H02K 33/00* (2006.01)
*H02K 35/00* (2006.01)
(52) U.S. Cl.
USPC ......... 310/15; 310/12.16; 310/12.33; 310/17; 310/23; 310/30
(58) Field of Classification Search ............... 310/12.16, 310/12.33, 15, 17, 23, 30, 90, 91; *H02K 33/00*, *H02K 35/00*
See application file for complete search history.

(56) References Cited

U.S. PATENT DOCUMENTS

| | | | | |
|---|---|---|---|---|
| 3,003,827 A | * | 10/1961 | Hentschke | 384/49 |
| 3,568,962 A | * | 3/1971 | Janssen | 384/536 |
| 3,942,051 A | * | 3/1976 | Stevinson et al. | 310/15 |
| 5,306,022 A | * | 4/1994 | Bourque | 277/543 |
| 6,915,881 B2 | * | 7/2005 | Hestermann | 188/43 |
| 8,130,086 B2 | * | 3/2012 | Choi et al. | 340/407.1 |
| 2005/0285454 A1 | * | 12/2005 | Choi et al. | 310/14 |
| 2007/0052329 A1 | * | 3/2007 | Koc et al. | 310/365 |
| 2007/0236106 A1 | * | 10/2007 | Koc et al. | 310/366 |
| 2008/0093953 A1 | * | 4/2008 | Koc et al. | 310/323.02 |
| 2011/0018369 A1 | * | 1/2011 | So | 310/30 |

FOREIGN PATENT DOCUMENTS

CN      2005-10076879       3/2006

OTHER PUBLICATIONS

Office Action from counterpart Chinese Patent Application No. 200910179804.1, mailed Jun. 26, 2012, 13 pages including English Summary.

* cited by examiner

*Primary Examiner* — John K Kim
(74) *Attorney, Agent, or Firm* — Blakely Sokoloff Taylor & Zafman LLP (57) ABSTRACT

A linear vibrator includes a casing defining an internal space of the vibrator, a bracket disposed under the casing and having a coil, to which electricity is applied to induce a magnetic field, an oscillator having a magnet received in a hollow portion of a yoke, one end of which is closed, and a cylindrical weight coupled onto the circumference of the yoke, and a spring member coupled with an upper portion of the casing to elastically support the oscillator such that the oscillator is movable in a linear motion, wherein the weight is provided with a plurality of circumferential recesses in which a rotary member is rotatably inserted while being in contact with a sidewall of the casing.

7 Claims, 6 Drawing Sheets

FIG.1

Prior art

FIG.5C

LINEAR VIBRATOR

CROSS REFERENCE TO RELATED APPLICATION(S)

This application claims the benefit of Korean Patent Application No. 10-2009-0067964, filed on Jul. 24, 2009, entitled "Linear Vibrator", which is hereby incorporated by reference in its entirety into this application.

BACKGROUND OF THE INVENTION

1. Technical Field

The present invention relates, in general, to a linear vibrator.

2. Description of the Related Art

Generally, a diversity of vibrators are provided in mobile electronic appliances, such as mobile phones, gaming machines, portable information terminals or the like, in order to, for example, provide a muting function and to prevent noise from creating disturbances in public places. In particular, such a vibrator is mounted in a portable phone to render an incoming call signal mute. Because of the recent tendency to make a portable phone having a small and slim size, the vibrator mounted in such a portable phone is also needed to be made small and slim in size as well as to have a high number of functions.

A vibrator is one of the call-receiving units which is presently being adapted to communication appliances such as portable phones. It is an element which converts electric energy into mechanical vibrations using the principle of creating an electromagnetic force, and is mounted in a portable phone for informing the owner of the phone of an incoming call in a mute state.

A conventional vibrator according to an embodiment of the prior art obtains mechanical vibrations by rotating a rotor having an eccentric weight. The rotating force of the rotor is obtained by a commutator or brush type motor structure, wherein an electric current is supplied to a coil of the rotor after being commutated via a contact between a brush and a commutator.

However, such a vibrator has a problem in that, when the brush passes through a gap between segments of the commutator, mechanical friction, electric sparks and abrasion occur there, and thus foreign material such as a black powder is created which shortens the lifetime of the vibrator. Therefore, a linear vibrator which is capable of stably obtaining to linear vibrations was proposed.

Figure 1:
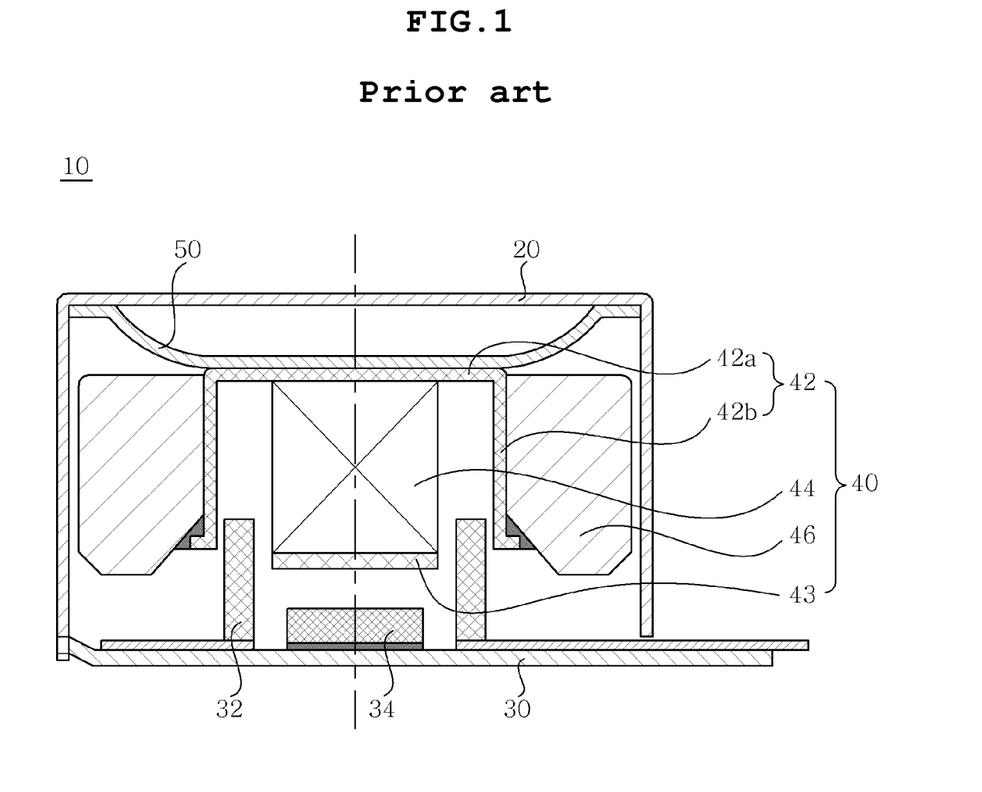
FIG. 1 is a cross-sectional view illustrating a conventional linear vibrator.

FIG. 1 is a cross-sectional view illustrating a conventional linear vibrator.

As illustrated in FIG. 1, the conventional linear vibrator 10 includes a casing 20 defining an internal space of the vibrator, a bracket 30 disposed under the casing 20 and having a coil 32, to which electricity is applied to induce a magnetic field, and a damper member 34, an oscillator 40 having a hollow yoke 42, a cylindrical magnet 44 received in the hollow portion of the yoke with a plate yoke 43 attached onto the lower surface thereof, and a weight 46 coupled onto the circumference of the yoke 42, and a spring member 50 coupled with an upper portion of the casing 20 to elastically support the oscillator 40 such that the oscillator 40 can move in a linear motion. Here, the hollow yoke 42 is a cylindrical element, one end of which is closed, and consists of a disk plate 42a and a cylindrical wall portion 42b extending downwards from the circumference of the disk plate 42a.

The linear vibrator 10 is operated such that, when electricity is supplied to the coil 32, the oscillator 40 begins to vibrate in a vertical direction owing to interaction between the magnetic field, which is created from a magnetic circuit composed of the cylindrical magnet 44, the plate yoke 43, and the yoke 42 and an electric field which is created from the coil 32.

However, such a conventional vibrator 10 has a problem in that, when external force is applied to the oscillator 40 in an inactivated state, because the oscillator 40 is connected with the spring member 50, unavoidable slight vibrations are generated to the oscillator 40, reducing reliability of the vibrator 10.

Further, when the oscillator 40 moves in a lateral motion or a rotating motion in an activated state, the oscillator 40 comes into direct contact with the casing 20, problematically creating touch sounds and impact.

SUMMARY OF THE INVENTION

Accordingly, the present invention has been made keeping in mind the above problems occurring in the related art, and the present invention is intended to propose a linear vibrator capable of preventing unavoidable slight vibrations and unwanted vibrations of an oscillator owing to contact with a casing.

In order to achieve the above object, according to one aspect of the present invention, there is provided a linear vibrator including a casing defining an internal space of the vibrator, a bracket disposed under the casing and having a coil, to which electricity is applied to induce a magnetic field, an oscillator having a magnet received in a hollow portion of a yoke, one end of which is closed, and a cylindrical weight coupled onto the circumference of the yoke, and a spring member coupled with an upper portion of the casing to elastically support the oscillator such that the oscillator is movable in a linear motion, wherein the weight is provided with a plurality of circumferential recesses in which a rotary member is rotatably inserted while being in contact with a sidewall of the casing.

Here, the rotary member may be a rotating ball.

Further, an elastic member may be interposed in the recess.

Further, lubricant oil may be applied onto an inner wall of the recess.

Further, N recesses may be provided on the circumference of the weight at intervals of 360°/N.

Further, the recess may have the size such that at least half of the rotary member is inserted.

Further, an inlet portion of the recess may have the same diameter as that of the rotary member.

Further, the recess may have the shape corresponding to the rotary member.

Further, the spring member may be a leaf spring, an inside of which is spaced apart from the casing with opposite ends thereof fixed to an upper portion of the casing, and an upper magnetic fluid material may be applied onto the upper surface of the leaf spring such that the magnetic fluid material is fixedly positioned owing to magnetic flux incident from the magnet.

According to the construction of the present invention, even when the rotary member is rotatably inserted into the circumference of the magnet and is rotated while being in contact with the sidewall of the casing so that external force is created, the oscillator is prevented from colliding with the casing and slightly vibrating.

Further, since the rotary member is inserted and supported in the recesses of the weight using the elastic member, the weight is easily assembled, and the occurrences of collision of the oscillator with the casing and the slight vibrations of the oscillator can be further prevented.

BRIEF DESCRIPTION OF THE DRAWINGS

The above and other objects, features and advantages of the present invention will be more clearly understood from the following detailed description when taken in conjunction with the accompanying drawings, in which.

DESCRIPTION OF THE PREFERRED EMBODIMENTS

Reference will now be made in greater detail to a preferred embodiment of the invention, an example of which is illustrated in the accompanying drawings. Wherever possible, the same reference numerals will be used throughout the drawings and the description to refer to the same or like parts. In describing the present invention, if it is determined that the detailed description on the related known technology makes the gist of the present invention unnecessarily ambiguous, the detailed description will be omitted.

Prior to making the description, it is noted that terms or words expressed in the specification and claims should not be limited to or construed by their conventional or dictionary meanings, but should be understood as meanings and concepts conforming with the technical spirits of the present invention because the inventor can properly define the concepts of terms or words used in order to elucidate his/her invention in the best manner.

Figure 2:
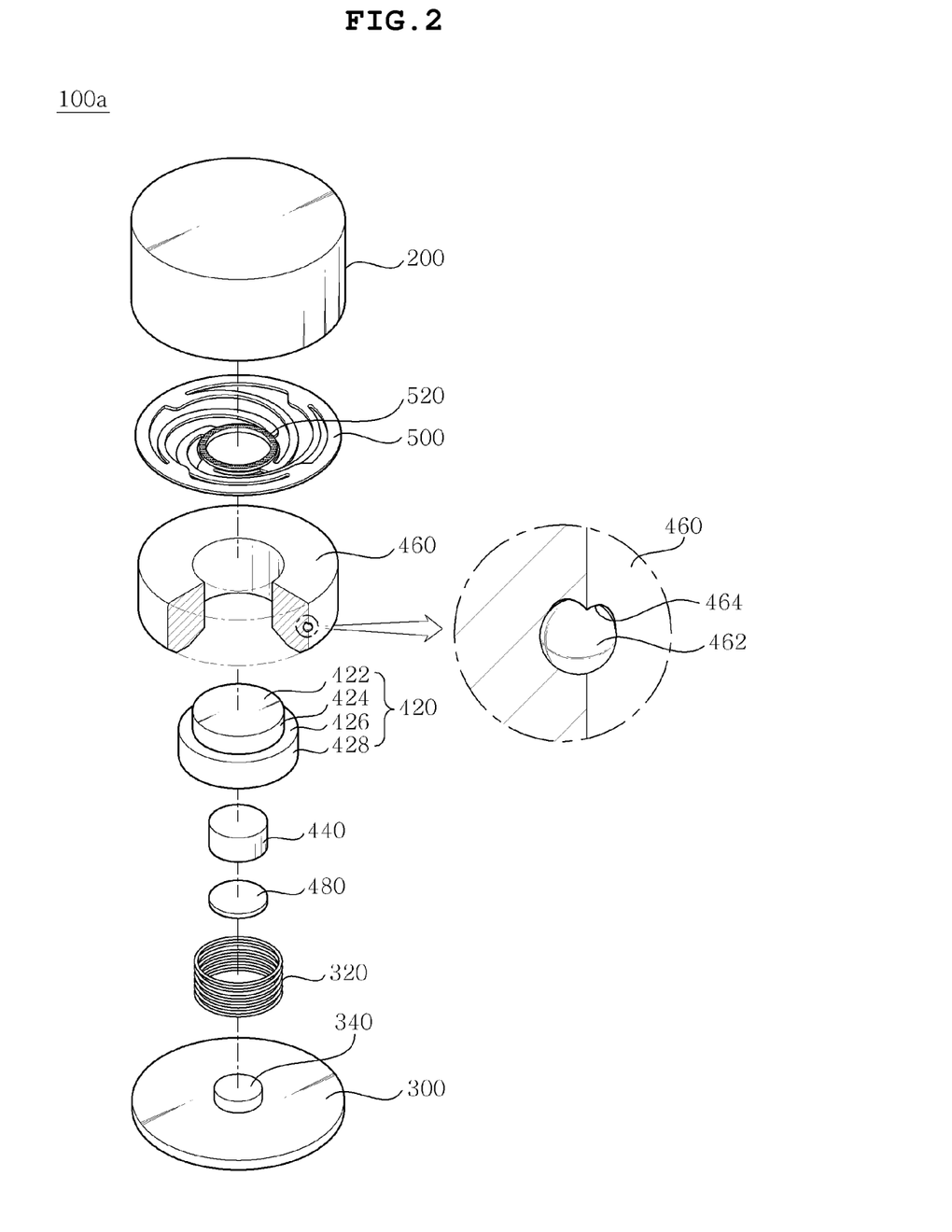
FIG. 2 is an exploded perspective view illustrating a linear vibrator according to a first embodiment of the present invention.
Figure 3:
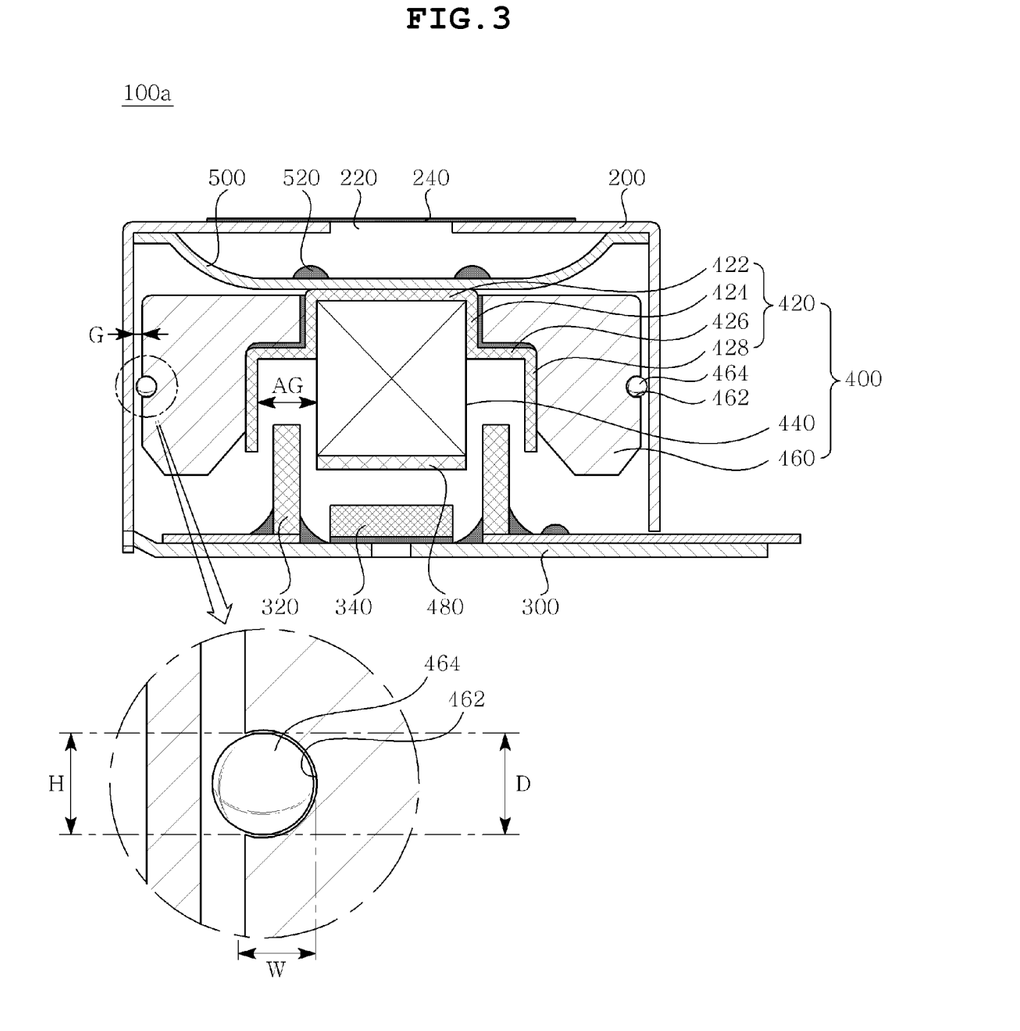
FIG. 3 is a cross-sectional view illustrating the linear vibrator of FIG. 2.

FIG. 2 is an exploded perspective view illustrating a linear vibrator according to a first embodiment of the present invention, and FIG. 3 is a cross-sectional view illustrating the linear vibrator of FIG. 2. Referring to these drawings, the linear vibrator 100a of the embodiment will be described.

As illustrated in FIGS. 2 and 3, the linear vibrator 100a of the embodiment includes a casing 200, a bracket 300, an oscillator 400, and a spring member 500.

The casing 200 is a receiving member defining a predetermined size of an internal space in which the oscillator 400 is received. The casing is opened at a lower portion thereof, which is closed by the bracket 300.

Here, the casing 200 has at least one through-hole 220 through which an upper magnetic fluid material 520 is applied onto the spring member 500 received in the casing 200. In order to prevent an effluence of the magnetic fluid material 520 after its application, the through-hole of the casing 200 is closed by a tape member 240, for example.

The bracket 300 is disposed under the casing 200 to close the internal space of the casing 200, and is provided thereon with a coil 320 for generating vibrations.

Here, the bracket 300 may be composed of a magnetic material in order to interact with an auxiliary magnet 462 to create a magnetic force. The bracket may also include a substrate member (a reference numeral of which is not designated) having a terminal which is connected to the coil 320 and supplies electricity thereto.

The coil 320 generates electric field of a predetermined intensity when powered from outside via the terminal, and a lower portion thereof is bonded onto the upper surface of the bracket 300 by means of a bonding material.

Here, the coil 320 is formed in a cylindrical shape having a hollow portion such that the linearly-vibrating magnet 440 of the oscillator 400 reciprocates in the hollow portion. The upper end of the coil is preferably positioned in an air gap AG between an inner circumference of a yoke 420 and an outer circumference of the magnet 440 such that the magnetic field induced from the magnet 440 and the electric field induced from the coil 320 interact smoothly with each other.

Meanwhile, a damper member 340 may be provided on the upper portion of the bracket 300 in order to prevent direct contact of the oscillator 400 with the bracket 300 and absorb shocks. Here, the damper member 340 is provided on the bracket 300 under the to magnet 440 such that the magnet 440 is prevented from coming into contact with the bracket while being reciprocated in the hollow portion of the coil 320 during linear vibration. Here, the damper member 340 may be composed of a diversity of shock-absorption materials such as rubber, polypropylene, or the like.

The bracket 300 may be provided with a protrusion (not shown) for fixedly supporting the coil 320. Here, the protrusion may be integrally formed when the bracket 300 is press-machined and formed, and allows the coil 320 to be seated between the protrusions, improving the assembly.

The oscillator 400 is a linearly vibrating element, which includes the yoke 420, the magnet 440, and the weight 460.

The yoke 420 fixedly supports the magnet 440 and the weight 460 and allows the magnet 440 to smoothly form magnetic flux. The yoke is formed in a cylindrical hollow portion, wherein an upper portion is closed and a lower portion is opened.

In particular, the yoke 420 has a disk plate 422, onto which the spring member 500 is attached, and a cylindrical wall portion extending downwards from the circumference of the disk plate. The disk plate 422 and an inner circumferential surface of the cylindrical wall portion define the hollow portion in which the magnet 440 is received. The disk plate 422 of the yoke 420 may have a greater diameter than the magnet 440, thereby forming the air gap AG between the inner circumferential surface of the yoke 420 and the outer circumferential surface of the magnet 440 and in which air gap the upper end of the coil 320 is disposed.

The cylindrical wall portion of the yoke 420 may be formed in a stepped manner so as to come closer to a portion of the side of the magnet 440 to increase coupling force between the magnet 440 and the yoke 420, to allow the weight 460 to be seated, and to form the air gap AG between the inner circumferential surface of the yoke 420 and the outer circumferential surface of the magnet 440. That is, the cylindrical wall portion consists of a first wall portion 424 extending downwards from the circumference of the disk plate 422 so as to form the hollow portion to receive a portion of the magnet 440, a seating surface 426 extending perpendicular to the first wall portion 424, and a second wall portion 428 extending downwards from an end of the seating surface 426.

The magnet 440 creates the magnetic field of a predetermined intensity so as to linearly vibrate the oscillator 400 using interaction with the coil 320. The magnet is received in the hollow portion of the yoke 420. That is, the upper portion of the magnet 440 is received in the hollow portion of the yoke.

Here, the magnet 440 is a cylindrical permanent magnet bonded onto the inner surface of the hollow portion of the yoke 420 by means of a bonding material, the magnet having upper and lower ends, polarities of which are opposite to each other, each end creating magnetic force of a predetermined intensity.

The magnet 440 may also be provided on the lower surface with a plate yoke 480 in order to smoothly form magnetic flux passing from the coil 320 towards the lower end of the yoke, i.e., towards the open side of the yoke.

The weight 460 is provided so as to be coupled with the circumference of the yoke 420 such that it adds a predetermined quantity of mass to the oscillator 400 for the linear vibration. That is, the weight 460 has a through-hole, in which the yoke 420 is inserted and fixed, so that it is coupled with the circumference of the yoke 420.

Here, the weight 460 is composed of nonmagnetic material such as tungsten so as not to undergo influence of the magnetic force from the magnet 440. The weight has a gap G from the inner circumferential surface of the casing 200 such that upon linear vibration, the magnet does not come into contact with the casing 200.

The weight 460 is provided with a circumferential recess 462, in which a rotary member 464 such as a rolling roller or a rolling ball is rotatably inserted in such a way as to contact the inner circumferential surface of the casing 200 with a minimum contact area (point contact or line contact). The rotary member 464 guides a vertical motion of the oscillator 400 while maintaining contact state with the outside of the weight 460 and the inner circumferential surface of the casing 200, so that, although external force is exerted to the vibrator, the oscillator 400 can be prevented from colliding with the casing 200.

The recess 462 has a shape corresponding to that of the rotary member 464 such that the rotary member 464 is easily received and smoothly rotated in the recess. Here, to this end, the length of the inlet portion H of the recess is preferably substantially identical to the diameter D of the rotary member 464. Further, the width W of the recess 462 is preferably greater than half the diameter D of the rotary member 464 and smaller than the diameter D of the rotary member 464 so as to allow the rotary member 464 to be inserted into the recess by at least half a diameter, thereby minimizing the disengagement of the rotary member 464 from the recess. That is, the recess 462 is formed like a sphere having a diameter slightly larger than the rotary member 464 so that the inlet portion H can be formed like a sphere cut at the same position as the diameter of the rotary member 464. Meanwhile, although the length of the inlet portion H is identical to the diameter of the rotary member 464, one side of the rotary member 464 is supported by the casing 200, so that the rotary member 464 can rotate in the recess without being disengaged from the recess.

Further, it is preferred that lubricant oil is applied onto the inner wall of the recess in order not to prevent the linear vibration of the oscillator 400 due to contact friction occurring between the recess and the rotary member 464.

In the present embodiment, the rotary members 464 are preferably symmetrically arranged on the circumference of the weight in order to provide a rotation-support force balanced between the weight 460 and the casing 200. This will be further described in detail later with reference to FIGS. 5A to 5C.

The spring member 500 elastically supports the oscillator 400 such that the oscillator can move in a linear motion. For example, the spring member may be a leaf spring which is spaced from the casing 200 with opposite ends thereof coupled with the upper portion of the casing 200.

Here, an upper magnetic fluid material 520 is preferably applied onto the upper portion of the spring member 500 as a damping material. Since the fluxes of the magnetic fluid material 520 are collected by the magnetic field of the cylindrical magnet 440, if the magnetic fluid material 520 is applied onto the upper portion of the spring member 500 in shape of leaf spring, the fluxes of the magnetic fluid material is formed in an annular shape by leak fluxes of the cylindrical magnet 440 attached onto the lower portion of the spring member 500. Such a magnetic fluid material 520 prevents direct contact between the oscillator 400 and the casing when the oscillator vibrates in a vertical direction, thereby absorbing the touch sounds and impact upon contact.

Here, the magnetic fluid material 520 is fabricated in such a way that magnetic powders are stably dispersed in a colloid state in liquid and surfactant is added in order to prevent the magnetic powders from being settled or precipitated by gravity or the magnetic field. For example, the magnetic fluid material 520 may be Fe3O4 or Fe—Co alloy powders dispersed in oil or water, or Co powders dispersed in toluene. The magnetic powders may be super fine powders of diameter ranging from 0.01 μm to 0.02 μm, which have a characteristic that the powders exhibit Brownian motion and that even upon application of external magnetic field, gravity or centrifugal force thereto, the concentration of magnetic powders is maintained to a constant level.

Figure 4:
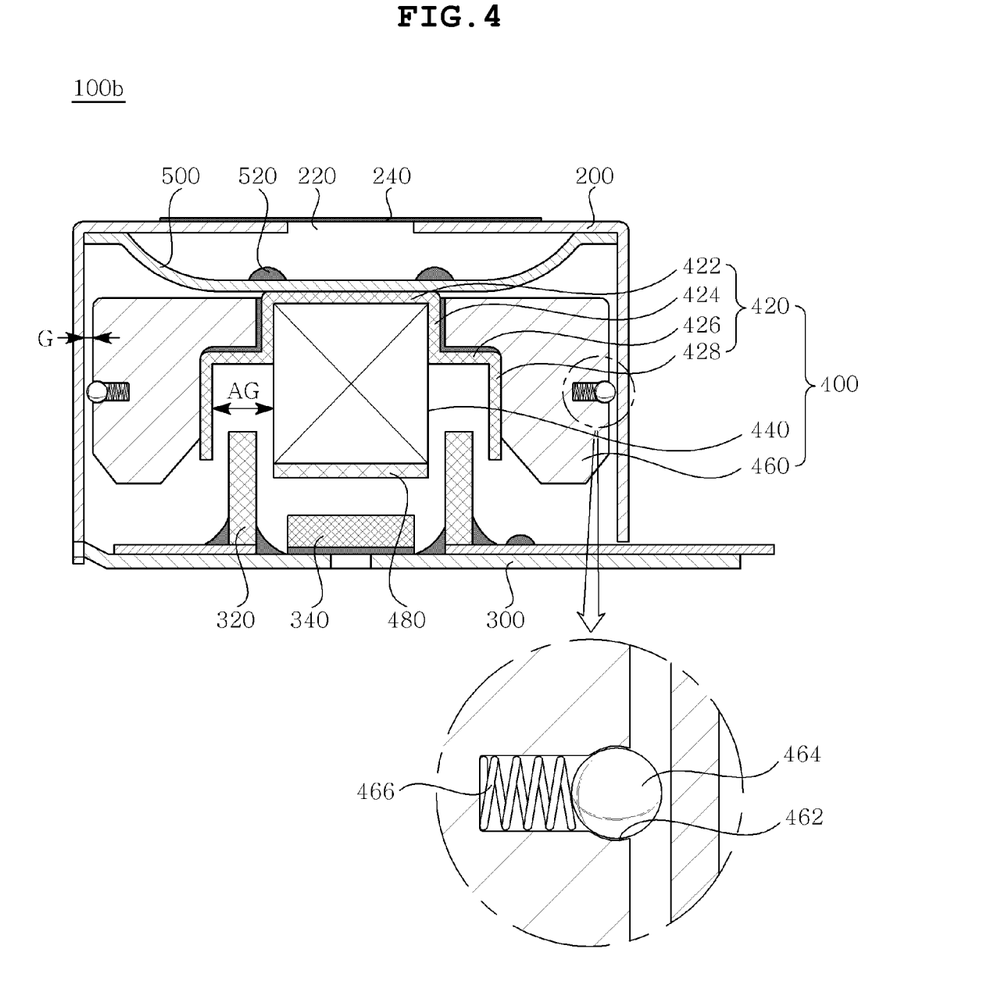
FIG. 4 is a cross-sectional view illustrating a linear vibrator according to a second embodiment of the present invention.

FIG. 4 is a cross-sectional view illustrating a linear vibrator according to a second embodiment of the present invention. Now the linear vibrator 100b of this embodiment will be described referring to the drawing. In describing this embodiment, like elements corresponding to those of the former embodiment refer to like reference numerals and the description on those similar elements will be omitted.

As illustrated in FIG. 4, the linear vibrator 100b has the structure similar to that of the first embodiment, except that an elastic member 466 is interposed in the recess 462 and the rotary member 464 is rotatably inserted into the recess.

Here, the elastic member 466 further facilitates assembly of the weight 460 as well as the rotary member 464, and even when the oscillator 400 moves in a lateral or rotary motion because of exertion of external force, the elastic member 466 absorbs shocks to some extent, thereby further preventing the oscillator 400 from colliding with the casing 200.

Here, the elastic member 466 may be a spring, which may be fixedly installed on the inner circumferential wall of the recess 462.

Figure 5A:
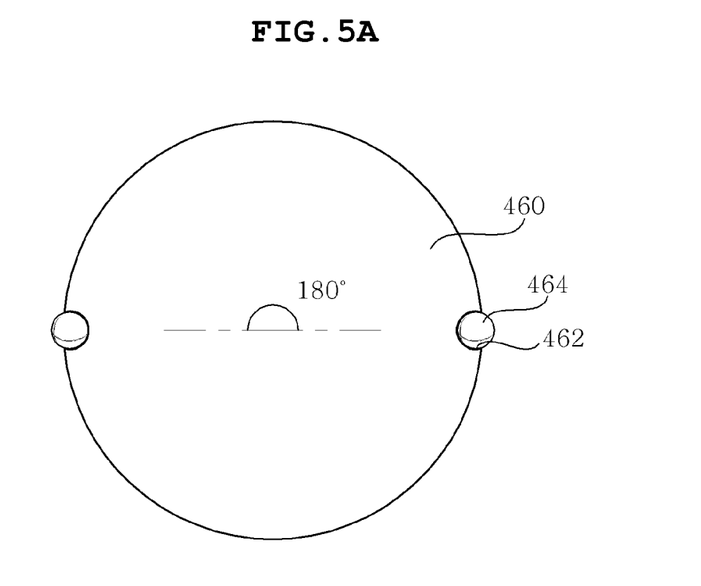
FIGS. 5A through 5C are views illustrating positions of recesses of the weight and the arrangement of the rotary member.
Figure 5B:
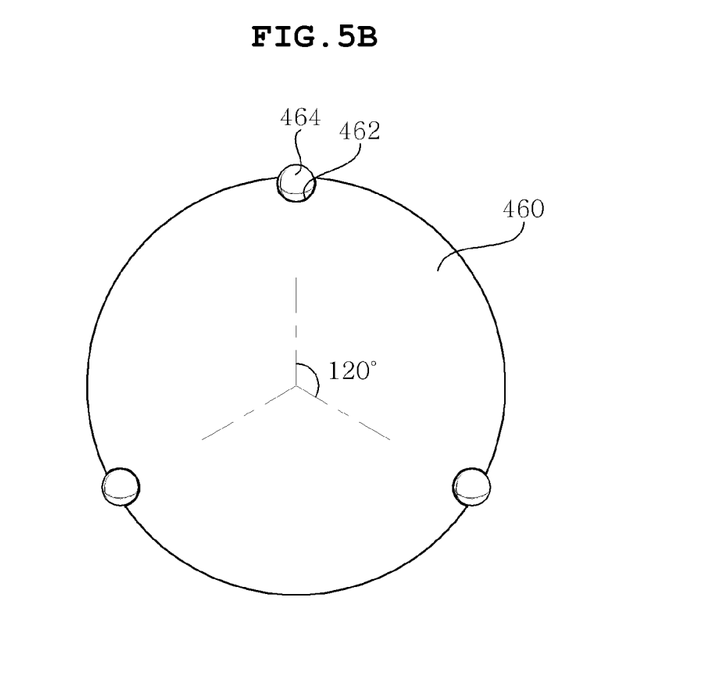
Figure 5C:
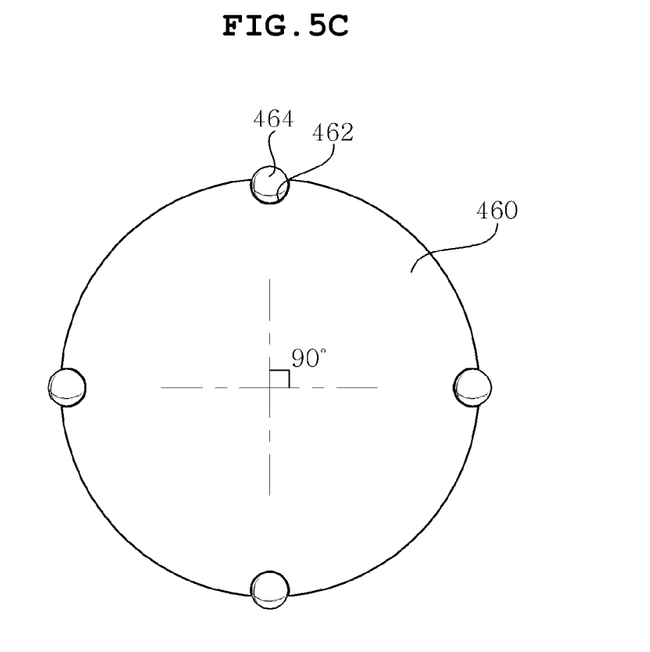

FIGS. 5A to 5C are views illustrating positions of recesses of the weight and the arrangement of the rotary member.

As illustrated in FIGS. 5A to 5C, the rotary member 464 is preferably symmetrically arranged in order to provide a balanced rotation-support force between the weight 460 and the casing 200. That is, N (N≧2) rotary members 464 are preferably arranged at distances of 360°/N on the cylindrical weight 460. For example, 2 rotary members may be arranged at 180° (See FIG. 5A), 3 rotary members at 120° (See FIG. 5B), or 4 rotary members at 90° (See FIG. 5C).

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A linear vibrator comprising:
   a casing defining an internal space of the vibrator;

a bracket disposed under the casing and having a coil, to which electricity is applied to induce a magnetic field;

an oscillator having a hollow yoke with a closed end, a magnet received in the hollow portion of the yoke, and a cylindrical weight coupled onto the circumference of the yoke and provided with a plurality of recesses on an outer circumferential surface of the weight, the plurality of recesses being disposed around the circumferential surface of the weight at distances of 360°/n, wherein n indicates a number of rotary members each inserted into a respective one of the recesses while being in contact with an inner sidewall of the casing, each of the recesses having a shape corresponding to that of its respective rotary member;

a spring member coupled with an upper portion of the casing to elastically support the oscillator such that the oscillator is movable in a linear motion.

2. The linear vibrator as set forth in claim 1, wherein the rotary member is a rotating ball.

3. The linear vibrator as set forth in claim 1, wherein an elastic member is interposed in the recess.

4. The linear vibrator as set forth in claim 1, wherein lubricant oil is applied onto an inner wall of the recess.

5. The linear vibrator as set forth in claim 1, wherein the recess has the size such that at least half of the rotary member is inserted.

6. The linear vibrator as set forth in claim 1, wherein an inlet portion of the recess has the same diameter as that of the rotary member.

7. The linear vibrator as set forth in claim 1, wherein the spring member is a leaf spring, an inside of which is spaced apart from the casing with opposite ends thereof fixed to an upper portion of the casing, and wherein an upper magnetic fluid material is applied onto the upper surface of the leaf spring such that the magnetic fluid material is fixedly positioned owing to magnetic flux incident from the magnet.

* * * * *